(12) United States Patent
Tanaka

(10) Patent No.: US 7,688,547 B2
(45) Date of Patent: Mar. 30, 2010

(54) MECHANISM FOR READ/WRITE DEVICE, READ/WRITE DEVICE, AND METHOD OF CLEANING READ/WRITE HEAD

(75) Inventor: Atsushi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 894 days.

(21) Appl. No.: 11/430,901

(22) Filed: May 10, 2006

(65) Prior Publication Data
US 2006/0256474 A1 Nov. 16, 2006

(30) Foreign Application Priority Data
May 12, 2005 (JP) .............................. 2005-139657

(51) Int. Cl.
G11B 5/41 (2006.01)
(52) U.S. Cl. .................. 360/128; 15/DIG. 12
(58) Field of Classification Search ................. 360/128; 15/DIG. 12
See application file for complete search history.

(56) References Cited

U.S. PATENT DOCUMENTS

| | | | |
|---|---|---|---|
| 5,182,691 A * | 1/1993 | Mimasu et al. | 360/128 |
| 5,386,333 A * | 1/1995 | Kang et al. | 360/128 |
| 5,467,238 A * | 11/1995 | Lee et al. | 360/128 |
| 6,067,211 A * | 5/2000 | Chliwnyj et al. | 360/128 |
| 6,208,488 B1 * | 3/2001 | Yamakawa et al. | 360/128 |
| 6,307,832 B1 * | 10/2001 | Novotny et al. | 369/300 |
| 6,678,118 B2 * | 1/2004 | Tanaka et al. | 360/128 |
| 7,372,668 B2 | 5/2008 | Tsuneyoshi et al. | |
| 2004/0042120 A1 * | 3/2004 | Davis | 360/128 |
| 2004/0169960 A1 * | 9/2004 | Hoelsaeter et al. | 360/128 |

FOREIGN PATENT DOCUMENTS

| | | |
|---|---|---|
| CN | 1080080 A | 12/1993 |
| JP | 1-260618 | 10/1989 |
| JP | 6-325333 | 11/1994 |
| JP | 11-328635 | 11/1999 |
| JP | 2006-155683 | 6/2006 |

OTHER PUBLICATIONS

Japanese Office Action dated Oct. 27, 2008 with Partial English Language Translation.
Chinese Office Action dated Dec. 21, 2008.
Japanese Office Action dated Jan. 20, 2009 with partial English-Language Translation.

* cited by examiner

*Primary Examiner*—Craig A. Renner
*Assistant Examiner*—Tamara Ashford
(74) *Attorney, Agent, or Firm*—McGinn IP Law Group, PLLC

(57) ABSTRACT

A head cleaning mechanism for a read/write device includes an arm with serially connected arm members that supports a cleaning component. The arm members fold as the arm is wound about a shaft formed on a guide plate which guides a stud attached to the arm as it is wound in a dead space of a corner of the device.

23 Claims, 14 Drawing Sheets

BEFORE TAPE CARTRIDGE INSERTION

AFTER TAPE CARTRIDGE INSERTION

MECHANISM FOR READ/WRITE DEVICE, READ/WRITE DEVICE, AND METHOD OF CLEANING READ/WRITE HEAD

BACKGROUND OF THE INVENTION

1. Technical Field

The present invention relates to a mechanism for a read/write device (e.g.,. a magnetic tape device, an optical disk device, a web device, etc.). Exemplarily, the present invention relates in particular to a cleaning mechanism for cleaning a read/write head of a device.

2. Related Art

The cleaning mechanism for magnetic heads of magnetic tape devices of the Related art are described using FIGS. 14-16C. FIG. 14 is an overall perspective view of the magnetic tape device of the related art. FIGS. 15A-15B show the operation of an arm section 102 of FIG. 14. FIGS. 16A-16C are views showing the arm section 102 of FIG. 14, and specifically FIG. 16A is an upper view of the arm section 102, FIG. 16B is a frontal view of the arm section 102, and FIG. 16C is a perspective view of the arm section 102.

Insertion slot 101 is an opening on the side of the magnetic tape device, as shown in FIG. 14, for inserting a tape cartridge holding magnetic tape in a spiral state. Arm section 102 of a cleaning mechanism for cleaning the magnetic head is mounted on one side of the magnetic tape device.

One end of arm section 102 of the cleaning mechanism pivots freely to allow a swinging motion. The other end of arm section 102 is mounted on brush 103. The other end of the arm section 102 extends towards magnetic head 104.

One side of the magnetic tape device contains bearing 105 capable of horizontal movement. During loading of the tape cartridge into the device from the insertion slot 101, bearing 105 moves horizontally in the loading direction. When extracting the tape cartridge from the device, bearing 105 moves horizontally towards the extraction direction. (See FIGS. 15A and 15B).

Cam surfaces 102a and 102b are installed on arm section 102 of the cleaning mechanism and make (See FIGS. 16A-16C) sliding contact with bearing 105 that moves in an action linked with loading of the tape cartridge into the device.

When there is no tape cartridge loaded in the magnetic tape device as shown in FIG. 15A, bearing 105 makes contact with cam surface 102b on arm section 102, and arm section 102 is positioned at a location where brush 103 attached to arm section 102 makes direct contact with the uppermost edge of the read/write surface of magnetic head 104.

When there is a tape cartridge loaded in the magnetic tape device as shown in FIG. 15B, bearing 105 makes contact with cam surface 102a on arm section 102, and arm section 102 centered on that moving axis is pressed downwards towards the lower part of the device, and brush 103 stops at a position separated from the magnetic tape guide path in front of magnetic head 104.

In other words, when the tape cartridge is placed within the device (hereafter called "loading"), brush 103 attached to arm section 102, moves from the uppermost edge of the read/write surface of magnetic head 104 to below the mounting surface of magnetic head 104, and rubs against the read/write surface of magnetic head 104. When the tape cartridge is extracted from the device, brush 103 separated from the magnetic tape guide path in front of magnetic head 104, returns to the uppermost edge of the read/write surface of magnetic head 104 while rubbing against the read/write surface of magnetic head 104. This operation cleans magnetic head 104.

In the above method of the related art, a brush is moved upwardly and downwardly along the magnetic head to clean the magnetic head. On the other hand, another method for cleaning magnetic heads utilized in the magnetic tape device as disclosed in JP-A No. 328635/1999, makes the brush contact the magnetic head, and then utilizes a read-track-position alignment means to move the magnetic head relative to the brush.

SUMMARY OF THE INVENTION

[Exemplary Problems in the Related Art]

Users want thinner tape devices. However, the type of magnetic tape device structure shown in FIGS. 14-16C may be difficult to make thinner. For example, a reason may be that the head cleaning mechanism cleans the magnetic head by swinging an arm attached to a brush upwardly and downwardly in a stroke larger than the height of the magnetic head. Therefore, a large space may be needed along the height (thickness direction) of the device. Moreover, the mechanism that moves the arm upwardly and downwardly while linked with the movement of the bearing itself, may require a somewhat large space. Thus, making the device small may be difficult.

For example, in the magnetic tape device shown in FIGS. 14-16C, the magnetic head may be cleaned each time the tape cartridge is loaded or extracted. Thus, the magnetic head may be cleaned more often than needed, and the brush may wear down quickly.

Moreover, for example, in this magnetic tape device, when cleaning the magnetic head is required due, for example, to an error that occurred in reading the magnetic tape, cleaning the magnetic head may be difficult unless the magnetic tape is first rewound onto the tape cartridge and the tape cartridge is extracted from the device.

Magnetic tape device of JP-A No. 328635/1999 utilizes a link mechanism for moving the brush relative to the magnetic head. This link mechanism was designed for large movement, and therefore the cleaning mechanism requires a large space.

In view of the foregoing and other exemplary problems, drawbacks, and disadvantages of the conventional techniques, it is an exemplary feature of the present invention to provide a mechanism for a read/write device, a read/write device, and a method of cleaning a read/write head. For example, the read/write device may not require excessive space and may be capable of being made thinner and smaller. For example, the read/write device may be capable of performing just the amount of cleaning required by the extent of contamination on the magnetic head, and may not require removal of the tape cartridge during cleaning.

The present invention provides a mechanism for a read/write device, including an arm that supports a component, the arm being windable within the read/write device.

The present invention also provides a read/write device, including means for supporting a component, and means for winding the supporting means.

The present invention also provides a method of cleaning a read/write head, including cleaning the read/write head that reads or writes data of the medium, and winding an arm that supports a cleaner that cleans the read/write head.

[Exemplary Advantage of the Invention]

For example, this invention may allow the read/write device to be made thinner and smaller since less excess space may be required.

Further, cleaning may also be performed just as needed according to the extent of contamination on the magnetic head, and there may be somewhat less brush deterioration. For example, it may be less necessary to extract the tape cartridge when cleaning is needed.

BRIEF DESCRIPTION OF THE DRAWINGS

The novel and exemplary features believed characteristic of the present invention are set forth in the appended claims. The invention itself, however, as well as other exemplary features and advantages thereof, will be best understood by reference to the detailed description which follows, read in conjunction with the accompanying drawings, wherein:

FIG. 15A shows the state of arm section 102 prior to loading the tape cartridge and FIG. 15B shows the state of the arm section after loading the tape cartridge; FIG. 16A is an upper view of the arm section 102, FIG. 16B is a frontal view of the arm section 102, and FIG. 16C is a perspective view of the arm section 102.

DETAILED DESCRIPTION OF THE EXEMPLARY EMBODIMENTS

Figure 1:
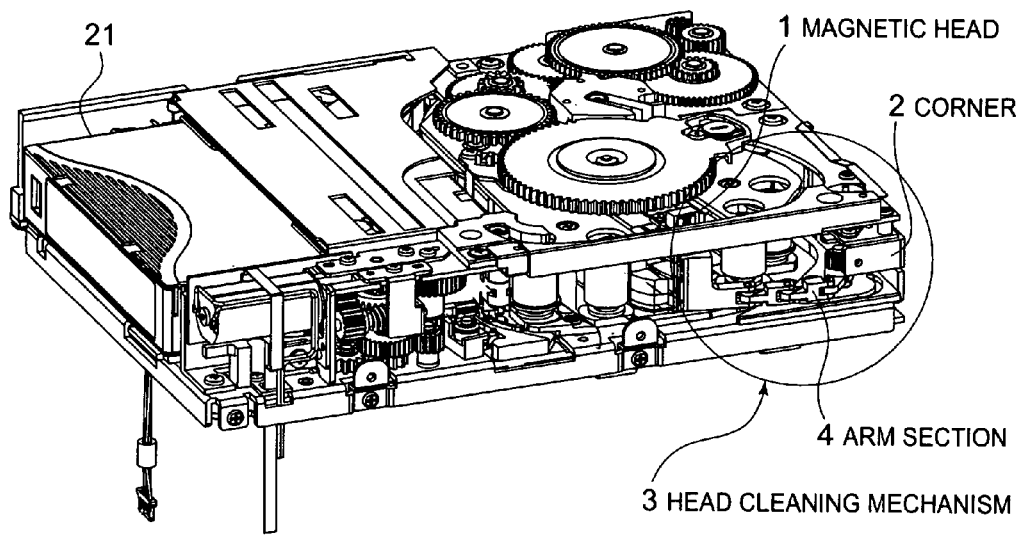
FIG. 1 is an exemplary perspective view of a read/write device 20 (e.g., a magnetic tape device, an optical disk device, a web device, etc.) containing a head cleaning mechanism of an exemplary embodiment of this invention.

The exemplary modes of this invention are described next while referring to the drawings.

Figure 2A:
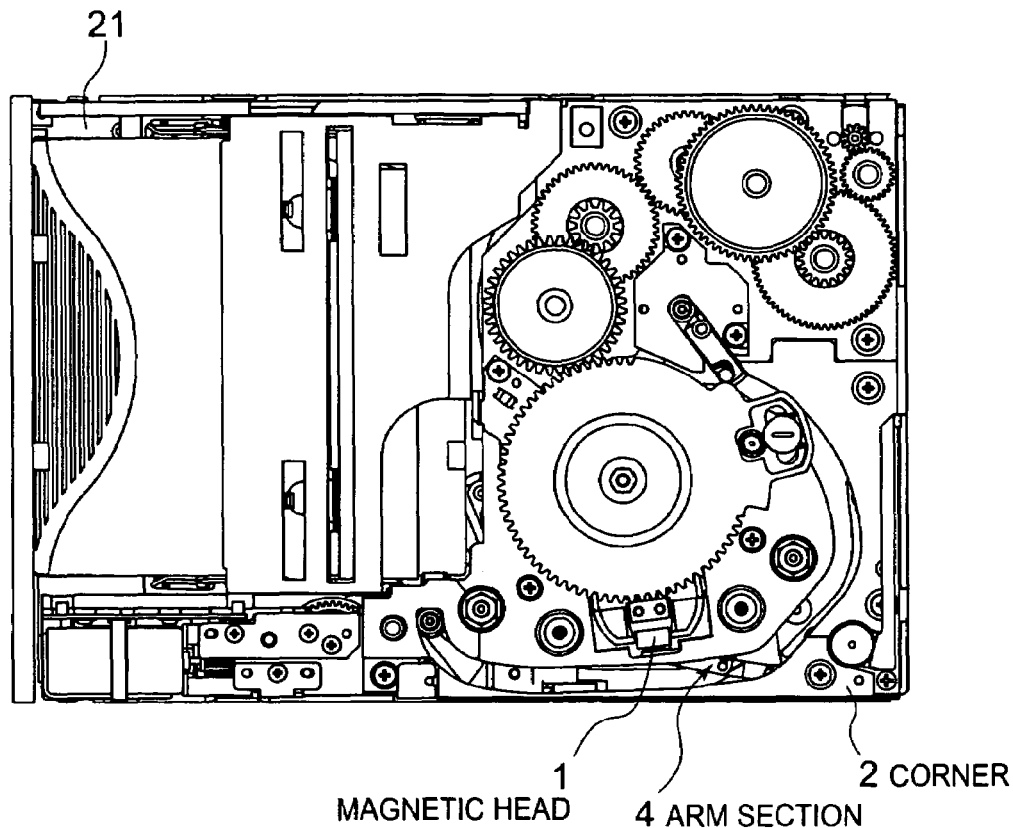
FIG. 2A is an exemplary upper view of a read/write device 20 (e.g., a magnetic tape device, an optical disk device, a web device, etc.)
Figure 2B:
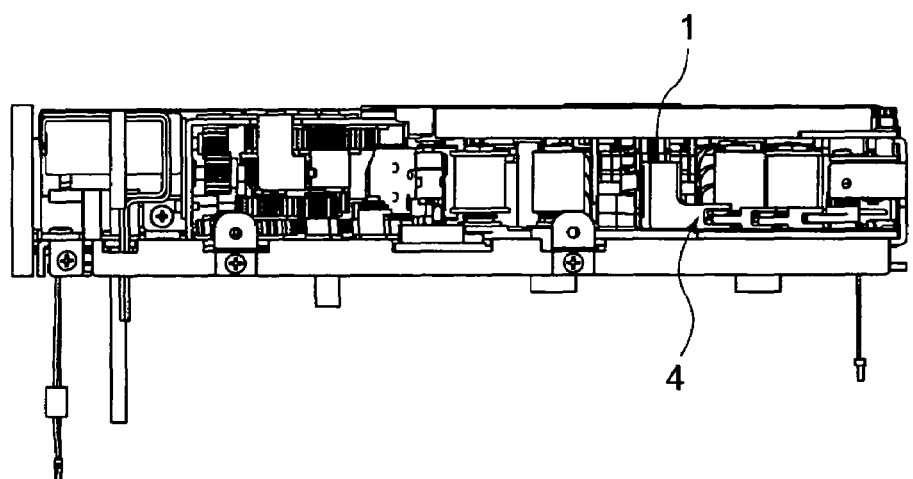
FIG. 2B is an exemplary frontal view of the read/write device 20.

FIG. 1 is an exemplary perspective view of magnetic tape device 20 (e.g., magnetic tape device 20, an optical disk device, a web device, etc.) containing a head cleaning mechanism 3 of an exemplary embodiment of this invention. FIG. 2A is an exemplary upper view of the read/write device 20 (e.g., magnetic tape device 20, an optical disk device, a web device, etc.), and FIG. 2B is an exemplary frontal view of the read/write device 20 (e.g., magnetic tape device 20, an optical disk device, a web device, etc.). FIG. 1 and FIGS. 2A and 2B show the exemplary magnetic head cleaning states.

For example, magnetic tape device 20 in FIGS. 1-2B may contain a guide path to guide a leader block holding the magnetic leader tip on the tape cartridge 21 loaded in the device, onto a machine reel for taking up the magnetic tape. Magnetic head 1 may be mounted on the side of this guide path. Head cleaning mechanism 3 for cleaning the read/write surface of magnetic head 1 may be mounted between corner 2 of the device and magnetic head 1.

To perform cleaning, for example, arm section 4 reaches a state extending horizontally from corner 2 of the device to magnetic head 1 as shown in FIGS. 1-2B. In this state, a brush (not shown in drawing) attached to the tip of arm section 4 contacts the read/write surface of magnetic head 1. A read-track-position alignment means of magnetic head 1 may clean magnetic head 1 by driving magnetic head 1 against the brush.

Figure 3:
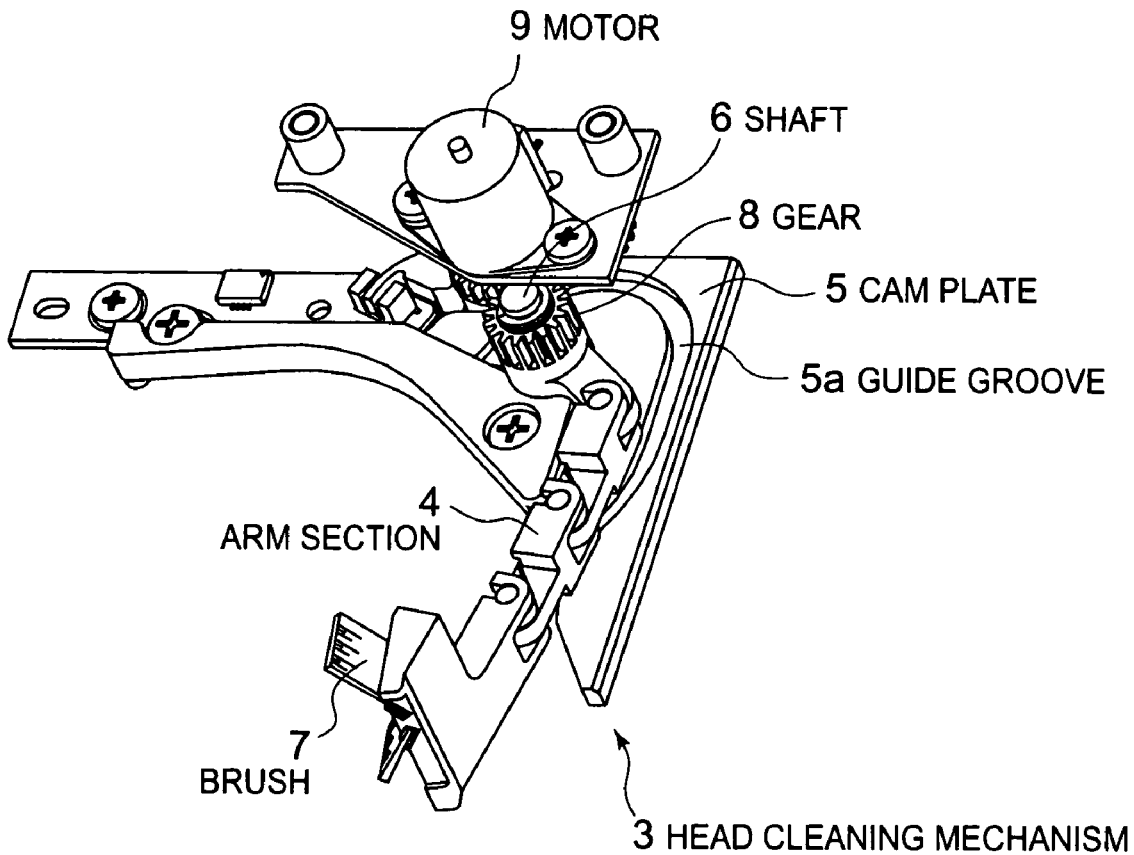
FIG. 3 is an exemplary perspective view of the head cleaning mechanism 3 of FIG. 1.
Figure 4:
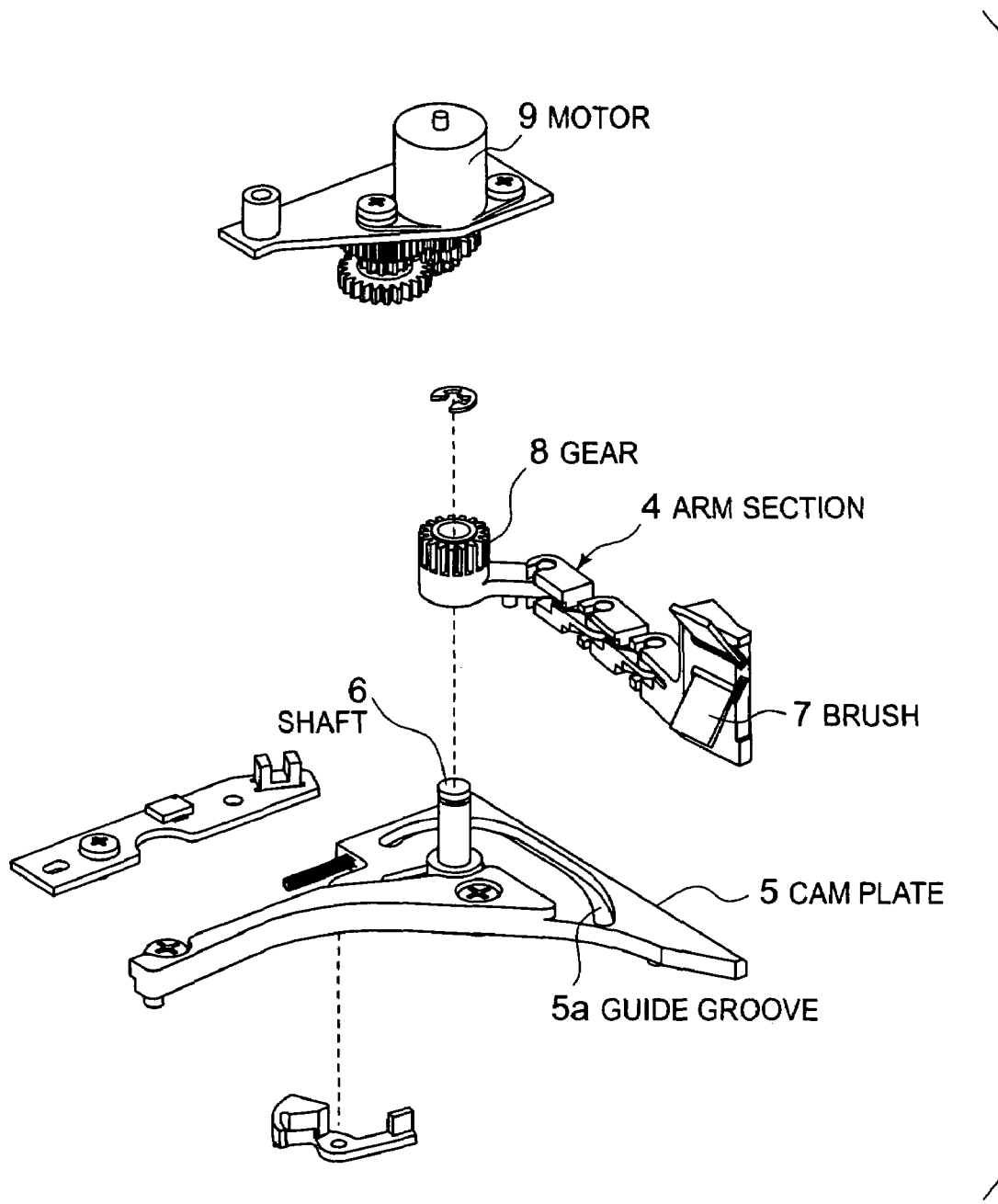
FIG. 4 is an exemplary exploded perspective view of the head cleaning mechanism 3 of FIG. 3.

FIG. 3 is an exemplary perspective view of the head cleaning mechanism 3 of FIG. 1. FIG. 4 is an exemplary exploded perspective view of the head cleaning mechanism 3 of FIG. 3.

For example, cleaning device 3 may include a cam plate 5, as shown in FIG. 3 and FIG. 4. Cam plate 4 may be installed in the dead space (e.g., the corner (location shown by reference numeral 2 in FIG. 2 (*a*))) of the device. Cam plate 5 may be formed as one integrated piece with shaft 6. Arm section 4 attached at its tip to brush 7, may be axially supported at the tip of shaft 6 for free movement. Gear 8 may be formed on a section of arm section 4 axially supported by shaft 6. Gear 8 engages with the gear of motor 9. Arm section 4 therefore moves centered on shaft 6 when motor 9 is driven.

Figures 5A, 5B:
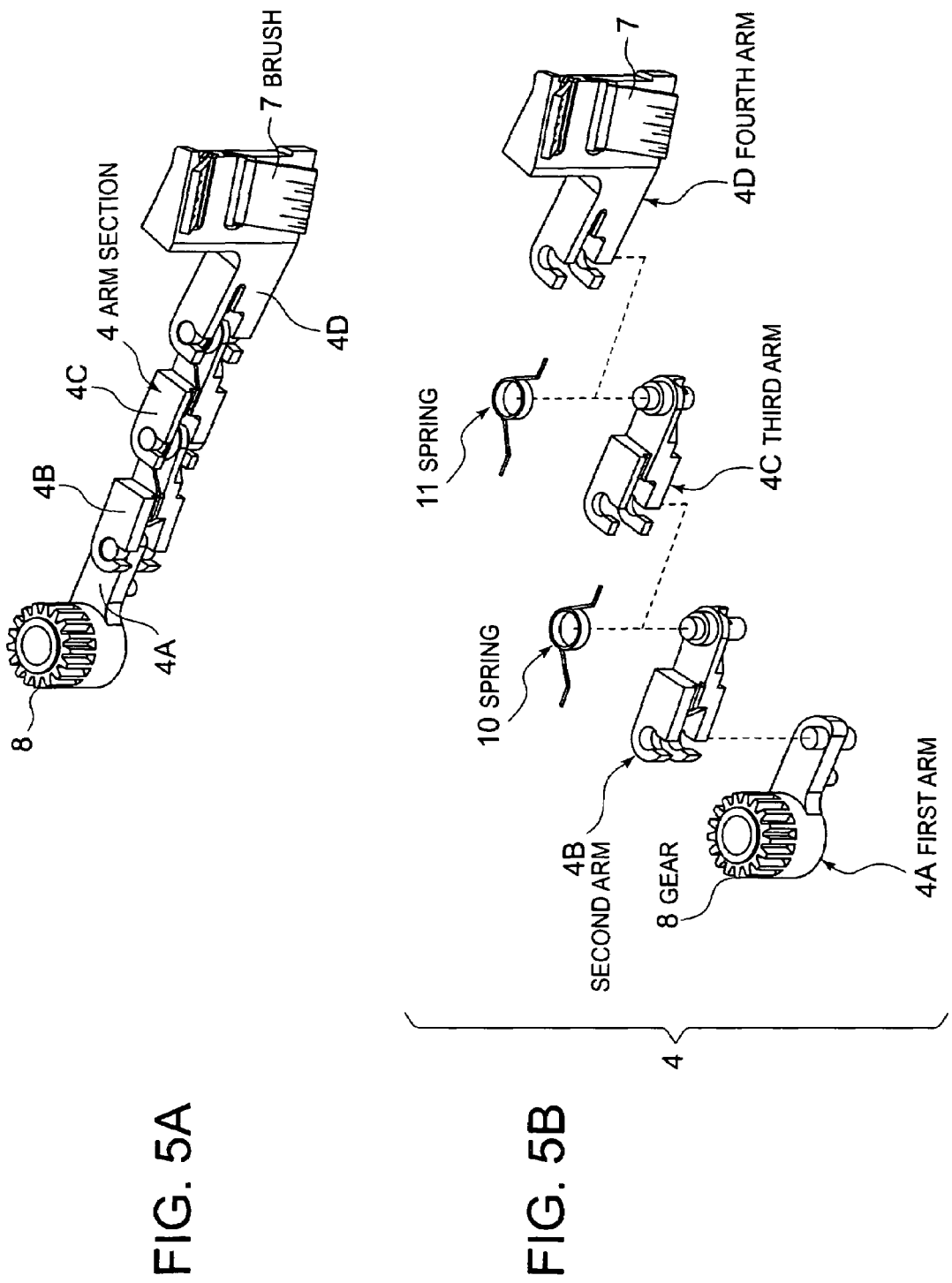
FIG. 5A is an exemplary perspective view of an arm section 4 shown in FIGS. 1-4.
FIG. 5B is an exemplary exploded view.

A structure of arm section 4 is described next in detail. FIG. 5A is an exemplary perspective view of the arm section 4 shown in FIGS. 1-4, and FIG. 5B is an exemplary exploded view.

For example, arm section 4, as shown in FIG. 5B, may be a serially and mutually connected first arm 4A and second arm 4B, and third arm 4C and fourth arm 4D. On the periphery, first arm 4A may be a part formed from gear 8 axially supported for free rotation by shaft 6, as shown in FIG. 3 and FIG. 4. Second arm 4B is connected for free movement to first arm 4A. Third arm 4C is connected to second arm 4B to open in a specified movement range.

For example, bias member 10 (e.g., coil spring 10, leaf spring 18*a* in FIG. 12, etc.) may be mounted at a connecting section (i.e., between third arm 4C and second arm 4B) to force third arm 4C in the opening direction with respect to second arm 4B. Fourth arm 4D is connected to open a specified movement range with respect to third arm 4B in the same way. Bias member 11 (e.g., coil spring 11, leaf spring 18*b* in FIG. 12 etc.) may be also installed at a connecting section (i.e., between fourth arm 4D and third arm 4C) to force fourth arm 4D in the opening direction with respect to the third arm 4C. Also, brush 7 is installed on fourth arm 4D.

Figure 6A:
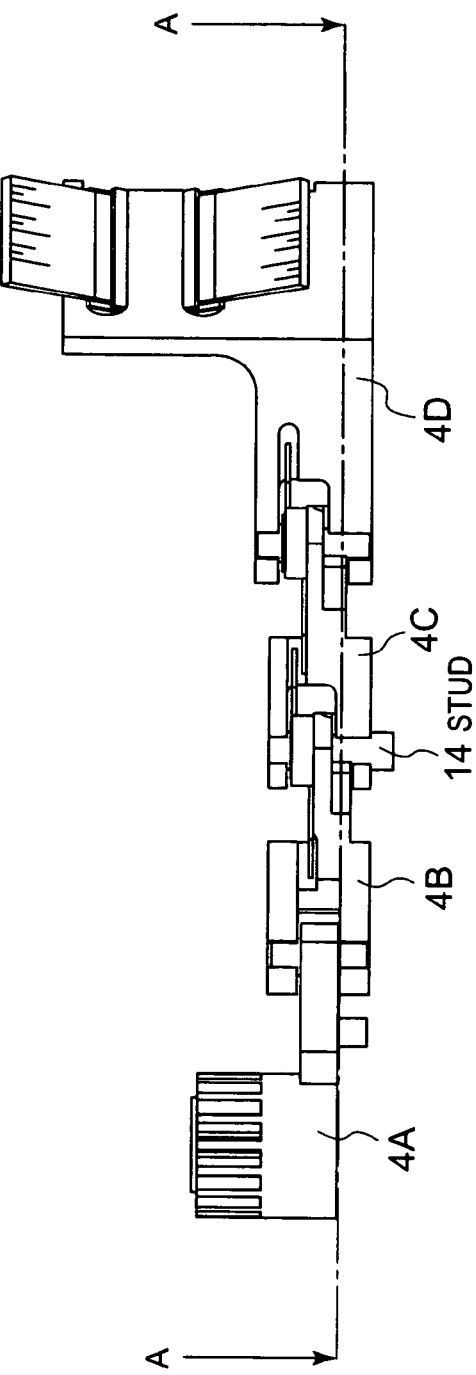
FIG. 6A is an exemplary frontal view of the arm section 4 shown in FIGS. 1-4.

FIG. 6A is an exemplary frontal view of the arm section 4 shown in FIG. 1-4, and FIG. 6B is an exemplary cross-sectional view taken along lines A-A in FIG. 6A.

Figure 6B:
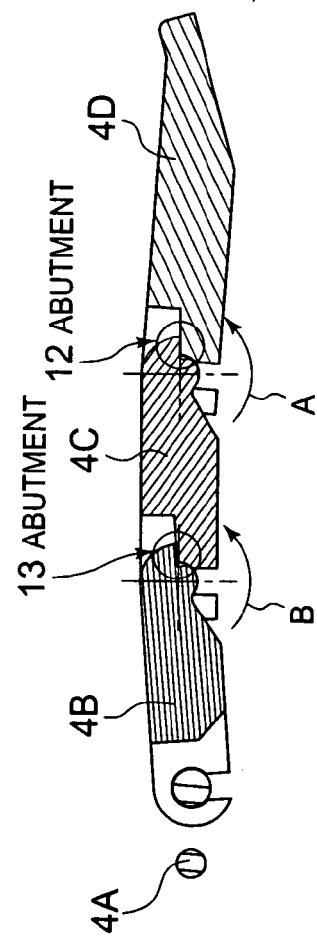
FIG. 6B is an exemplary cross-sectional view taken along lines A-A in FIG. 6A.

For example, as FIG. 6B shows, fourth arm 4D may be formed to move in the direction of arrow A to open with respect to third arm 4C. The opening range may be limited. For example, both fourth arm 4D and third arm 4C may be formed to thrust against abutment 12, when fourth arm 4D has opened a specified angle (e.g., approximately 180 degrees) with respect to third arm 4C.

Similarly, third arm 4C may be formed to move to open in the direction of arrow B with respect to the second arm 4B. The opening range may be limited. For example, both third arm 4C and second arm 4B may be formed to thrust up against abutment 13 when third arm 4C is open a specified angle (e.g., approximately 180 degrees) with respect to second arm 4B.

Figure 7A:
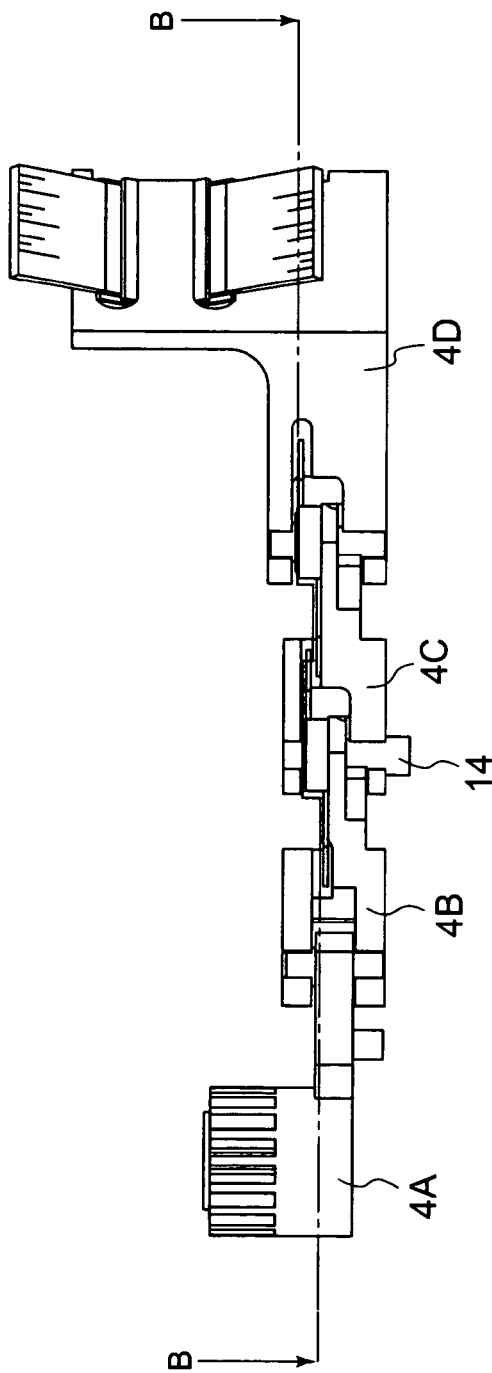
FIG. 7A is an exemplary frontal view of the arm section 4 shown in FIGS. 1-4.
Figure 7B:
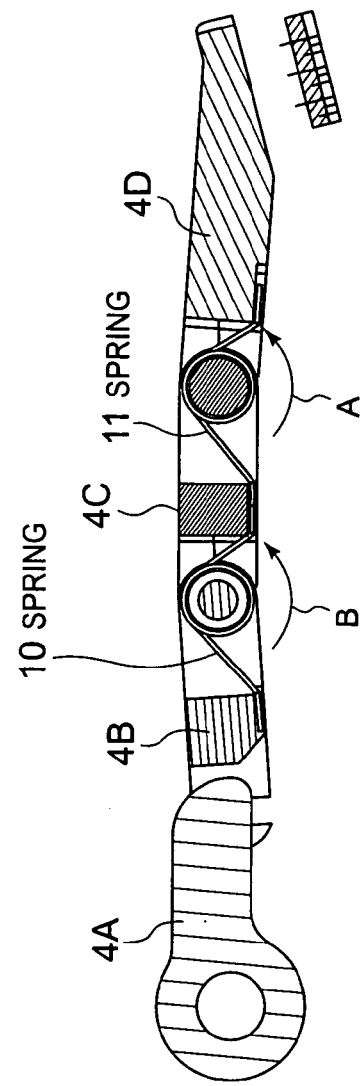
FIG. 7B is an exemplary cross-sectional view taken along lines B-B in FIG. 7A.

FIGS. 7A-7B shows in detail an exemplary structure where fourth arm 4D is formed in the opening direction with respect to third arm 4C, and third arm 4C is formed in the opening direction with respect to second arm 4B. Bias members 10 and 11 (e.g., coil spring 10 and 11, leaf spring 18a and 18b in FIG. 12, etc.) may be installed at the sections connecting second arm 4B, third arm 4C, and fourth arm 4D.

For example, as shown in FIG. 7B, coil spring 11 may be installed at the section connecting fourth arm 4D and third arm 4C. Both ends of the spring 11 force fourth arm 4D in the opening direction (arrow A direction) with respect to third arm 4C. For example, coil spring 10 may be installed at the section connecting third arm 4C and second arm 4B. Both ends of spring 10 force third arm 4C in the opening direction (arrow B direction) with respect to second arm 4B.

For example, when there is no external force applied to arm section 4 structured in this way, the force of springs 10 and 11 may make the fourth arm 4D open to a specified angle with respect to third arm 4C, as shown in FIG. 5A, and third arm 4C stays opens to a specified angle with respect to second arm 4B. In other words, for example, fourth arm 4D may fold up with respect to third arm 4C, and third arm 4C may fold up with respect to second arm 4B.

Arm section 4 may move along a guide groove. For example, stud 14 may be formed on the lower surface of arm section 4, as shown in FIG. 6 and FIG. 7. Stud 14 includes a section connecting third arm 4C and fourth arm 4D.

For example, guide groove 5a may be formed on cam plate 5 as can be seen from viewing FIG. 3 and FIG. 4, for example. Stud 14 of arm section 4 is inserted into guide groove 5a of cam plate 5. Driving motor 9 makes arm section 4 move along guide groove 5a.

FIGS. 8A-8D are exemplary flat views showing the state when arm section 4 is moved along guide groove 5a of cam plate 5.

Figure 8A:
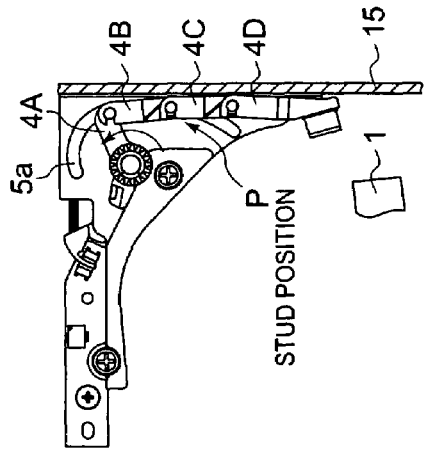
FIGS. 8A-8D are exemplary views of the exemplary operation of the cleaning mechanism 3 of FIG. 3.

FIG. 8A shows the exemplary state of arm section 4 when brush 7 makes contact with magnetic head 1, and cleaning is performed by driving magnetic head 1. In the state shown in this exemplary drawing, the position (hereafter called "stud position P") of stud 14 of arm section 4 may be positioned at one end on the magnetic head 1 side of guide groove 5a.

In other words, in this exemplary embodiment, brush 7 makes contact with magnetic head 1 to allow cleaning, when stud position P is positioned on the end of magnetic head 1 side of guide groove 5a. Here, guide groove 5a is a guide section for guiding brush 7 installed on the tip of arm section 4, towards magnetic head 1, when arm section 4 extends to magnetic head 1.

A motor (not shown in the drawings) starts up in this exemplary state, and first arm 4A moves in the direction of the arrow in FIG. 8A-8D. Second arm 4B, third arm 4C, and fourth arm 4D, move along with the movement of first arm 4A.

Figure 8B:
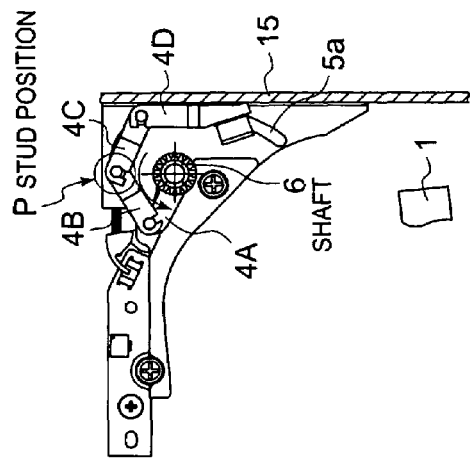

For example, second arm 4B, third arm 4C, and fourth arm 4D, may make contact with cover 15 of the device when stud position P arrives at the position as shown in FIG. 8B. Second arm 4B may fold to an acute angle with respect to first arm 4A at this time.

Figure 8C:
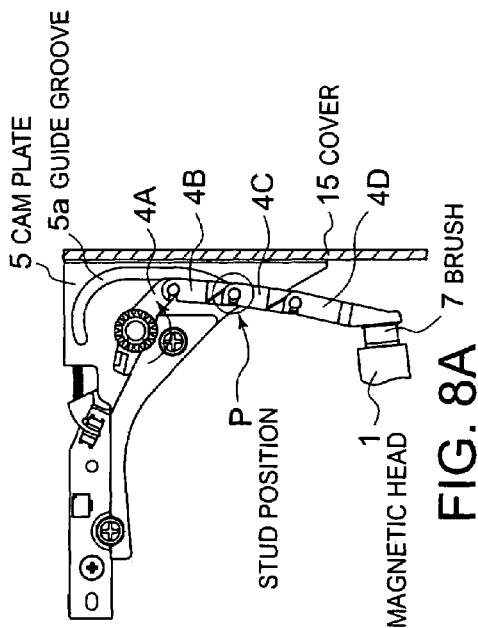

Moreover, for example, when stud position P has arrived at the position as shown in FIG. 8C, second arm 4B may move away from cover 15. However, third arm 4C, and fourth arm 4D, still remain in contact with cover 15. Cover 15 therefore may keep the third arm 4C opening angle small with respect to second arm 4B, and third arm 4C reaches a folded state with respect to second arm 4B.

Figure 8D:
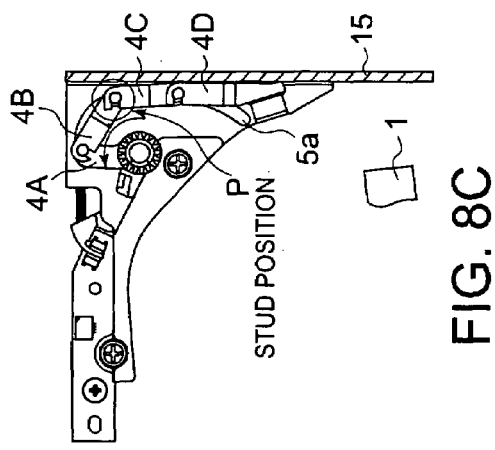

For example, third arm 4C may be separated from cover 15 when stud position P has arrived at the other edge of guide groove 5a, as shown in FIG. 8D. However, fourth arm 4D may be still in contact with cover 15. Fourth arm 4D angle opening with respect to third arm 4C may be therefore kept small by cover 15, and fourth arm 4D may attain a folded state with respect to third arm 4C.

In this exemplary state, as can be seen from FIG. 8D, the arm section including first arm 4A, second arm 4B, third arm 4C and fourth arm 4D, is installed on cam plate 5 in a folded state wound centering on shaft 6. In other words, for example, the arm section 4 may be efficiently stored in the dead space (e.g., on a corner (location shown by reference numeral 2 in FIG. 2 (a))) of the device.

For example, first arm 4A may move in a direction opposite the arrow in FIGS. 8A-8D, in order to shift from a stored state as shown in FIG. 8D to a head cleaning state as shown in FIG. 8A. Stud position P may proceed along guide groove 5a to the position shown in FIG. 8C when first arm 4A is moved from the stored position shown in FIG. 8D, in the direction opposite the arrow in FIG. 8D by reversing the motor (not shown in drawing). In this exemplary state, fourth arm 4D may open to a specified angle (e.g., approximately 180 degrees) with respect to third arm 4C due to the force of the spring (shown by reference numeral 11 in FIG. 7B).

When stud position P proceeds to the position shown in FIG. 8B, the third arm 4C may open to a specified angle opening (e.g., approximately 180 degrees) with respect to second arm 4B due to the force of the spring (shown by reference numeral 10 in FIG. 7B). Further, stud position P may proceed to the position shown in FIG. 8A, brush 7 attached to fourth arm 4D makes contact with magnetic head 1 to allow cleaning.

When cleaning is performed in this exemplary way, the arm section 4 may extend to magnetic head 1 from the dead space (e.g., device corner (location shown by reference numeral 2 in FIG. 2 (a))) far away from magnetic head 1.

An example of head cleaning method using head cleaning mechanism 3 is described next using FIGS. 1-7B.

For example, arm section 4 of head cleaning mechanism 3 may be usually stored in a wound state in corner 2 of the device as shown in FIG. 8D.

For example, a tape cartridge 21 is loaded in magnetic tape device 20, and errors may occur when read or write operations on the magnetic tape are performed. When the error rate exceeds a specified value, the magnetic tape may be rewound back onto the tape cartridge 21, and a command to clean magnetic head 1 sent from the software controlling data read and write (operations). Data read out from the magnetic head, for example, also contains error correction data, and when the error correction frequency (occurrence rate) has become high, the device decides that contamination might occur and sends a cleaning command.

Figure 9:
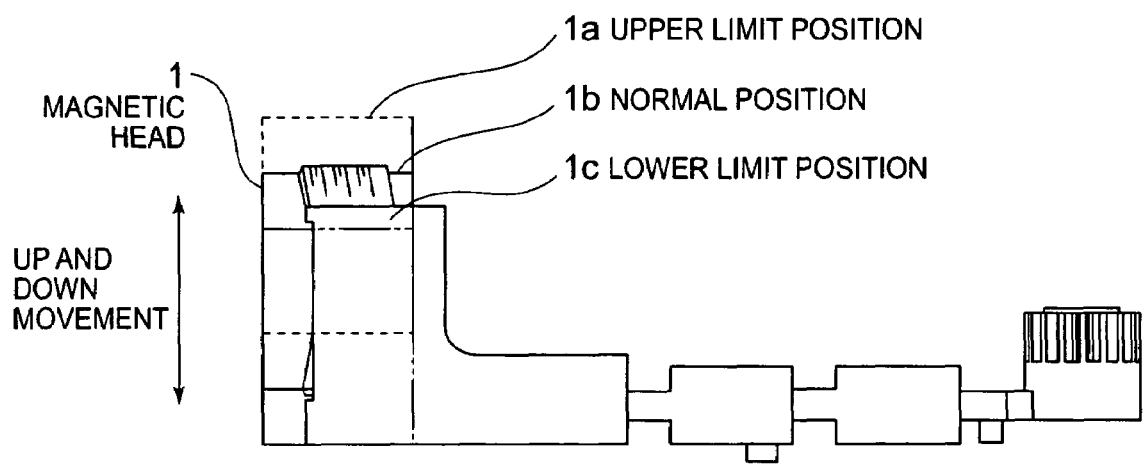
FIG. 9 shows an exemplary upward and downward movement of magnetic head 1.

For example, when a cleaning command is issued, arm section 4 stored in a wound state in corner 2 of the device, may extend to magnetic head 1, and brush 7 makes contact with magnetic head 1 (state in FIG. 8A). By moving magnetic head 1 in this exemplary state with the read-track-position alignment means, magnetic head 1 may be cleaned. FIG. 9 shows an exemplary upwardly and downwardly movement of magnetic head 1. As shown in FIG. 9, after brush 7 makes contact with magnetic head 1, magnetic head 1 may repeat moving upwardly to upper limit position 1a and moving downwardly to lower limit position 1b through normal position 1c, to clean magnetic head 1.

The cleaning automatically ends when performed for a specified number of times or for a specified time, etc. The cleaning end command may also be issued separately.

When cleaning ends, arm section 4 is once again stored in a wound state in corner 2 of the device, as shown in FIG. 8 (d).

As described above, in this exemplary embodiment, head cleaning mechanism 3 is structured so that when not cleaning, arm section 4 attached to brush 7 is folded in a spiral state, and is stored in corner 2 forming a dead space in magnetic tape device 20. When cleaning, arm section 4, in a wound state, extends nearly straight from corner 2 of the device to magnetic head 1, and brush 7 makes contact with magnetic head 1.

For example, the space for installing head cleaning mechanism 3 may therefore be kept small, and the device may be made thin and small. Also, magnetic head 1 may be cleaned as needed according to the extent of contamination on magnetic head 1. Thus, there may be less wear on the brush.

Moreover, unlike the conventional device that performs cleaning each time the tape cartridge 21 is removed, this exemplary embodiment may not require removal of the tape cartridge 21 to perform cleaning, while the magnetic tape may need to be rewound onto the tape cartridge 21.

When reading a magnetic tape of cartridge 21, for example, the following process may be performed. First, insert a cartridge 21 to the loading slot of magnetic tape device 20. Secondly, transfer cartridge 21 to the position in which a magnetic tape is extracted. Thirdly, extract the tape from the cartridge 21 and thread the tape onto the reel in magnetic tape device 20. Fourthly, start reading or writing.

In the conventional art, a transition from a first step to a second step is necessary to move the brush. However, magnetic tape device 20 of the present invention provides may move the brush and clean the head without transitioning from a first step to a second step, because a brush movement mechanism in the exemplary embodiment may not relate to a cartridge 21 insertion mechanism of magnetic tape device 20. Thus, without removing and inserting a cartridge 21 from/into magnetic tape device 20 (transition between the first and the second step), this invention may allow magnetic tape device 20 to clean the head.

While this invention has been described with reference to exemplary embodiments, this description is not intended as limiting. Various modifications of the illustrative embodiments, as well as other embodiments of the invention, will be apparent to persons skilled in the art upon taking description as a whole. It is, therefore, contemplated that the appended claims will cover any such modifications or embodiments as fall within the true scope of the invention.

For example, while a tape mechanism has been described above in the exemplary embodiment, the invention would be equally applicable to any mechanism using a wound material to be threaded onto another mechanism (e.g., a reel).

Figure 10:
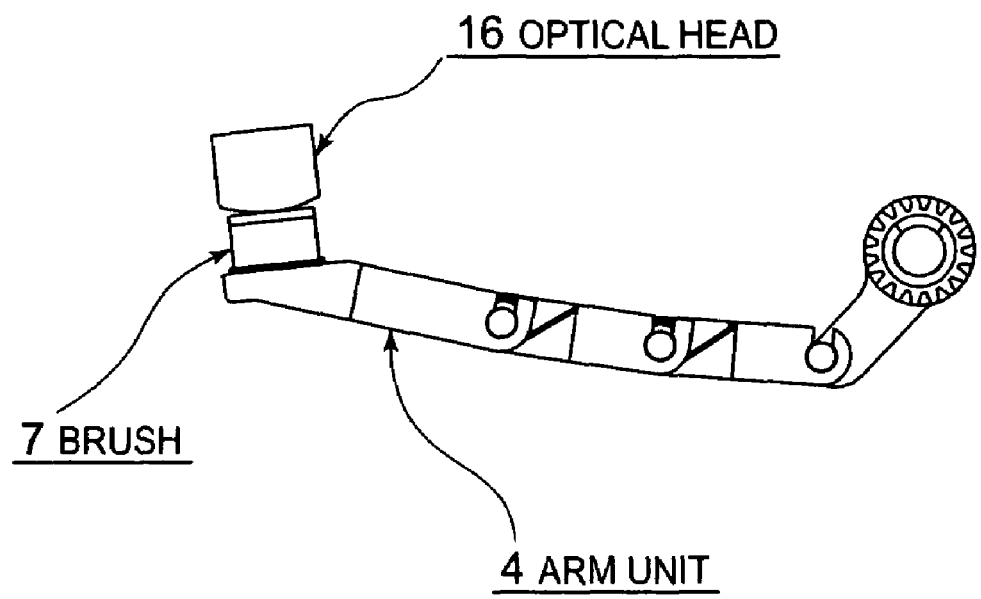
FIG. 10 is an exemplary top view of arm unit 4, brush 7, and head 16 (e.g., optical head)

Further, the present invention would be equally applicable to an optical head cleaning, as shown in FIG. 10. FIG. 10 shows an exemplary top view of arm unit 4, brush 7, and optical head 16. The same winding mechanism (e.g., arm unit 4) may be used for optical head cleaning.

Figure 11:
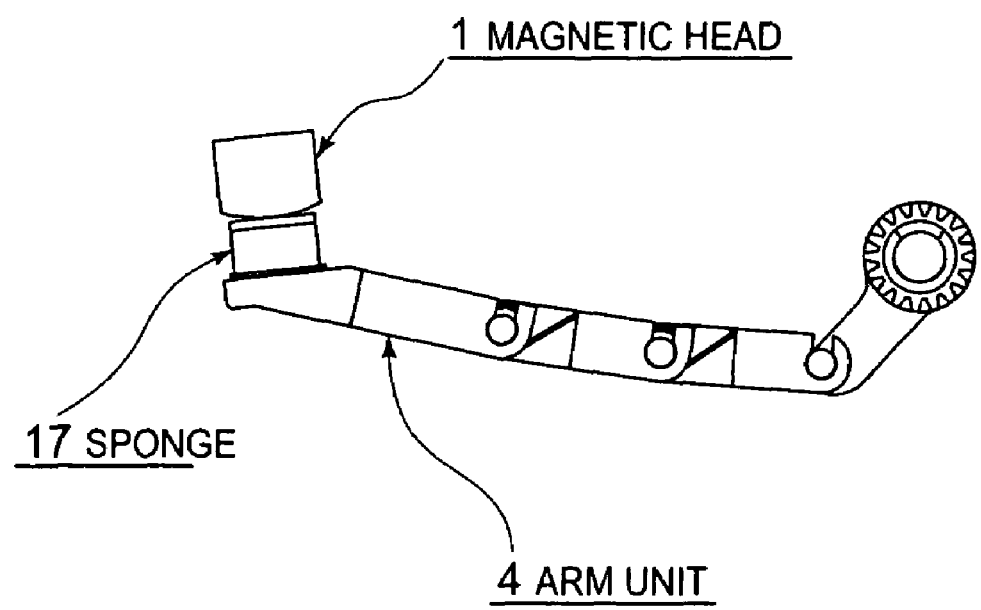
FIG. 11 is an exemplary sponge 17 as an exemplary embodiment of a cleaner (e.g., sponge 17)

For example, sponge 17 would be used as cleaner substituting for brush 7, as shown in FIG. 11.

Figure 12:
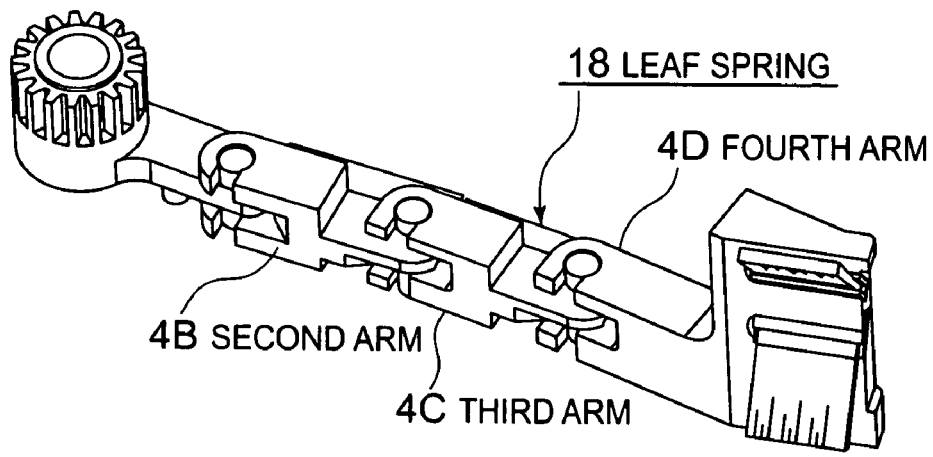
FIG. 12 is an exemplary perspective view of the arm section 4 of another exemplary embodiment.

Further, leaf spring 18 (e.g., 18a, 18b) may be used as bias means substituting for spring 10 and spring 11 in FIG. 5. FIG. 12 shows an exemplary perspective view of the arm section of another exemplary embodiment. Leaf spring 18a may be mounted at this connecting section to force third arm 4C in the opening direction with respect to second arm 4B. Leaf spring 18b also may be installed at this connecting section, to force fourth arm 4D in the opening direction with respect to the third arm 4C.

Figure 13:
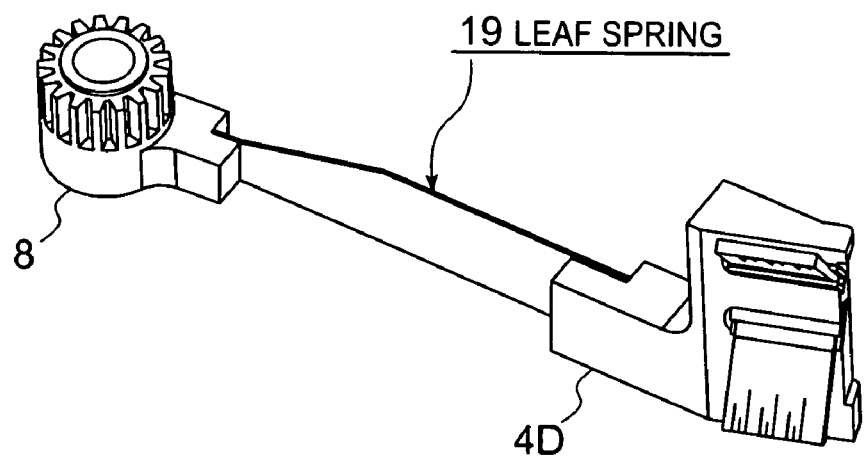
FIG. 13 is an exemplary perspective view of the arm section 4 of another exemplary embodiment.
Figure 14:
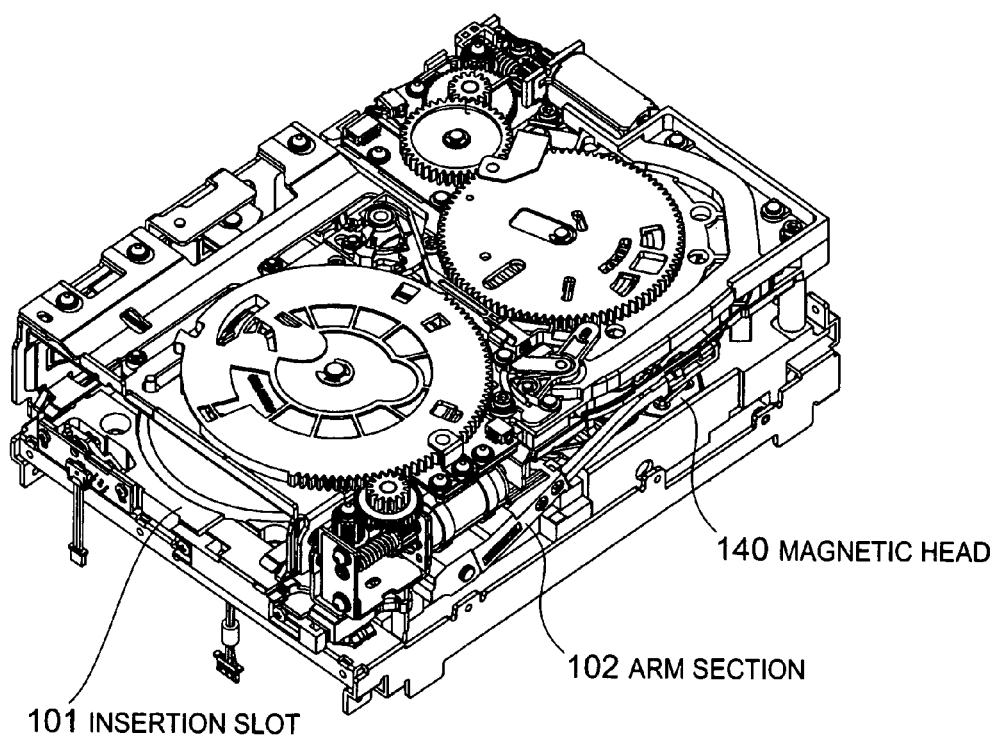
FIG. 14 is an overall perspective view of the magnetic tape device of the related art.
Figure 15A:
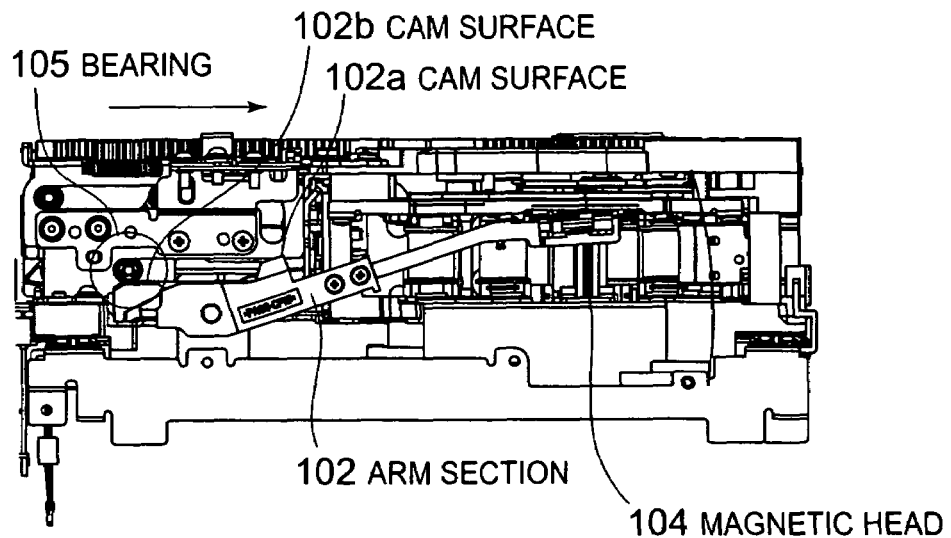
FIGS. 15A-15B show the operation of an arm section 102 of FIG. 14, and specifically
Figure 15B:
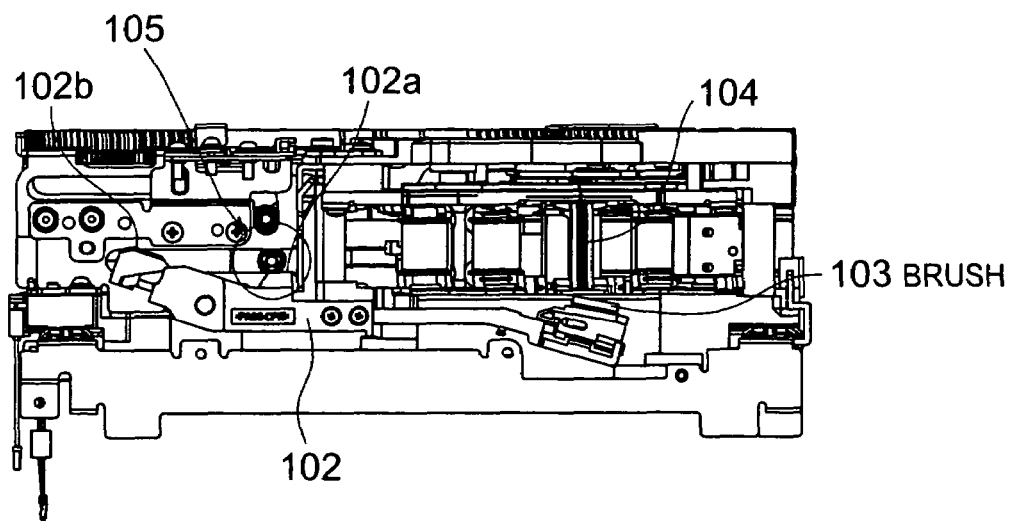
Figure 16C:
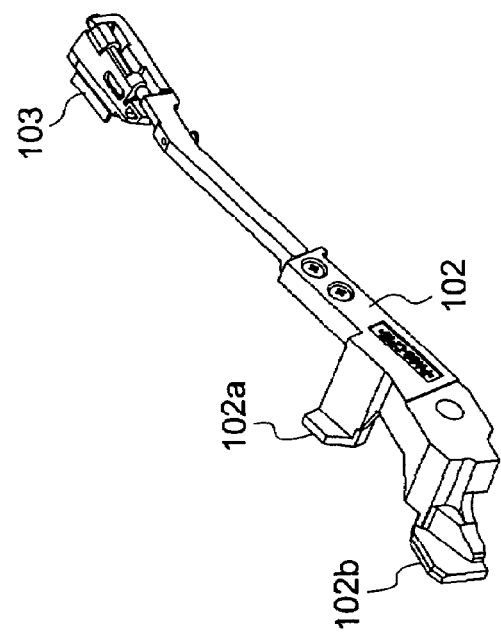
FIGS. 16A-16C are views showing the arm section 102 of FIG. 14, and specifically
Figure 16A:
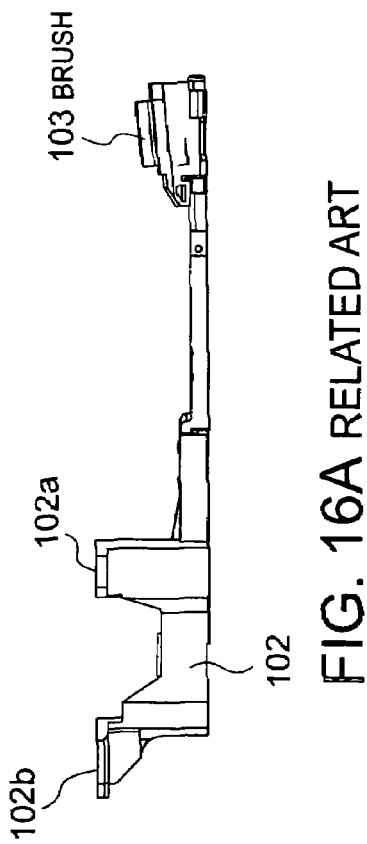
Figure 16B:
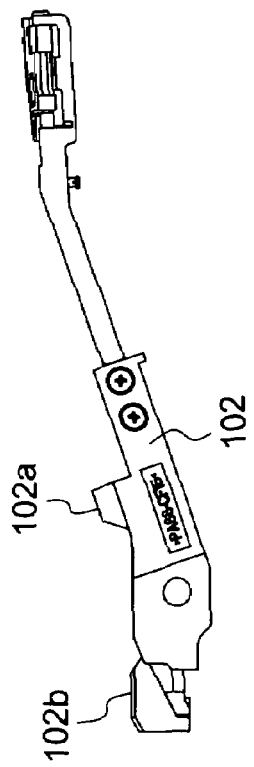

Further, leaf spring 19 may be used as arm section substituting for spring 10, spring 11, and arms 4A-4D. FIG. 13 shows an exemplary perspective view of the arm section of another exemplary embodiment. Leaf spring 19 may be mounted between gear 8 and fourth arm 4D. Since leaf spring 19 forces fourth arm 4D in the opening direction with respect to gear 8, while leaf spring 19 is wound, the movement which is similar to movement of spring 10, spring 11, and arms 4A-4D, may be achieved.

Further, the inventor's intent is to encompass all equivalents of all the elements of the claimed invention even if the claims are amended during prosecution.

This application is based on Japanese Patent Application No. 2005-139657 filed on May 12, 2005 and including specification, claims, drawings and summary. The disclosure of the above Japanese Patent Application is incorporated herein by reference in its entirety.

What is claimed is:

1. A mechanism for a read/write device, comprising:
   a component comprising a cleaner;
   an arm that supports said component, said arm being windable in a corner of said read/write device;
   a guide plate formed in said corner of said read/write device and comprising a guide groove, said arm comprising a stud which moves along said aide groove when said arm is being wound; and
   a shaft formed on said guide plate, said arm being windable about said shaft.

2. The mechanism according to claim 1, said read/write device further comprising:
   a read/write head that reads or writes data of a medium, wherein said cleaner cleans said read/write head.

3. The mechanism according to claim 1, wherein said arm includes serially connected arm members and said arm winds by folding up said arm members.

4. The mechanism according to claim 1, wherein said arm includes a leaf spring and said arm winds by winding up said leaf spring.

5. The mechanism according to claim 3, wherein said arm includes:
   a bias member formed between said arm members to bias a first arm member towards an open direction with respect to a second arm member; and
   an abutment that limits an opening range of said first arm member.

6. The mechanism according to claim 5, wherein said bias member includes a spring.

7. The mechanism according to claim 6, wherein said spring includes a coil spring.

8. The mechanism according to claim 6, wherein said spring includes a leaf spring.

9. A read/write device, comprising:
   a read/write head that reads data from or writes data to a medium; and
   said mechanism of claim 1.

10. The read/write device according to claim 9, wherein said medium includes a web.

11. The read/write device according to claim 10, wherein said read/write head includes a magnetic head and said web includes a magnetic tape.

12. The read/write device according to claim 9, wherein said read/write head includes an optical head.

13. The read/write device according to claim 9, wherein:
when cleaning, said arm extends and said component is contactable with said read/write head; and
when not cleaning, said arm winds and said component is out of contact with said read/write head.

14. The read/write device according to claim 9, wherein said corner comprises a dead space of said read/write device, said arm being windable in said dead space.

15. The read/write device according to claim 1, wherein said arm comprises plural arm members, an arm member of said plural arm member comprising a gear which is driven by a motor for winding said arm, and
wherein said shaft is inserted through a hole in said arm member and said arm member rotates about said shaft as said motor winds said arm.

16. The read/write device according to claim 9, further comprising:
a guide that guides said component to said read/write head.

17. The read/write device according to claim 16, wherein said guide includes a guide groove.

18. The read/write device according to claim 9, further comprising:
a wall section that contacts said arm to wind said arm.

19. The read/write device according to claim 9, wherein said read/write head moves with respect to said component to clean said read/write head.

20. A method of cleaning a read/write bead, comprising:
cleaning a read/write head of a read/write device by using a cleaner, the read/write head reading data on or writing data to a medium;
winding an arm that supports said cleaner in a corner of said read/write devices,
wherein said corner comprises a dead space in said read/write device, and
wherein said method further comprises winding said arm in said dead space of said read/write device, and
providing a guide plate in said corner of said read/write device, said guide plate comprising:
a guide groove, said arm comprising a stud which moves along said guide groove as said arm is being wound; and
a shaft formed on said guide plate near said guide groove,
wherein said winding said arm comprises winding said arm about said shaft.

21. The method of cleaning a read/write head according to claim 20, further comprising:
during said cleaning, extending said arm such that said cleaner is contactable with said read/write head; and
when not performing said cleaning, winding said arm such that said cleaner is out of contact with said read/write head 22. The method of cleaning a read/write head according to claim 20, further comprising:
guiding said cleaner to said read/write head.

23. The method of cleaning a read/write head according to claim 20, further comprising:
contacting a wall section to said arm to wind said arm.

* * * * *